United States Patent [19]
Elson et al.

[11] 3,768,501
[45] Oct. 30, 1973

[54] INFLATABLE ARTICLE VALVE

[75] Inventors: Edward E. Elson, Anaheim; Bert Lane, Palm Springs, both of Calif.

[73] Assignee: Automatic Helium Balloon Systems, Inc., Beverly Hills, Calif.

[22] Filed: May 10, 1971

[21] Appl. No.: 141,711

Related U.S. Application Data

[63] Continuation-in-part of Ser. No. 825,690, May 19, 1969, abandoned.

[52] U.S. Cl.............. 137/231, 46/90, 141/348, 251/149.1, 5/348
[51] Int. Cl............................................. F16k 15/20
[58] Field of Search ............. 137/223, 231; 46/32, 46/90; 141/313, 348, 349; 251/149.1; 5/348, 349, 350

[56] References Cited
UNITED STATES PATENTS

| | | | |
|---|---|---|---|
| 2,859,932 | 11/1958 | Mackal | 76/90 X |
| 2,924,041 | 2/1960 | Jackson | 46/90 |
| 3,154,050 | 10/1964 | Hanson | 46/90 X |
| 1,700,632 | 1/1929 | Gay | 251/149.1 |
| 3,477,105 | 11/1969 | Cranage | 251/149.1 X |
| 2,792,669 | 5/1957 | Jackson | 46/90 |

Primary Examiner—Harold W. Weakley
Attorney—Mahoney, Hornbaker & Schick

[57] ABSTRACT

A valve including an open-ended tubular body member having inwardly directed end flanges and an outwardly directed intermediate flange sealably engaging an article with which the valve is used. A front closed tubular slide member has an outer peripheral lip between the body member end flanges and is slideably engaged within the body member. At least one port is placed within the slide member intermediate its ends. A deformable peripheral lip is provided on the inner face of the slide member and adapted to be releasably engageable by a tool to permit opening and closure of the valve upon axial displacement of the slide member within the body member. The valve is especially suitable for use with inflatable articles such as balloons.

13 Claims, 21 Drawing Figures

PATENTED OCT 30 1973 3,768,501

INVENTORS
EDWARD E. ELSON
BERT LANE
BY
William R. Liberman
ATTORNEY

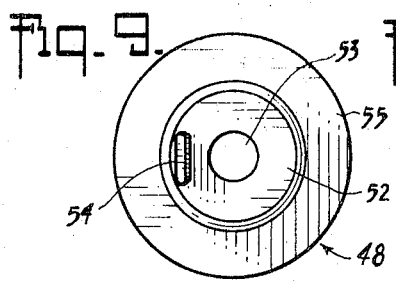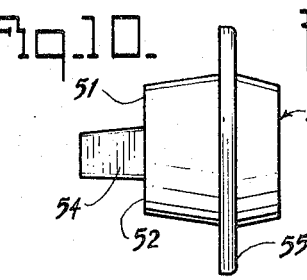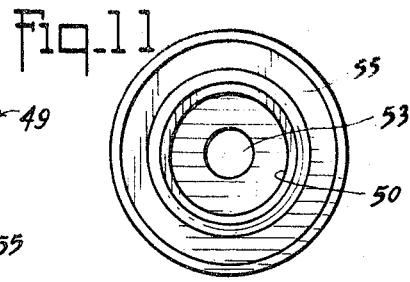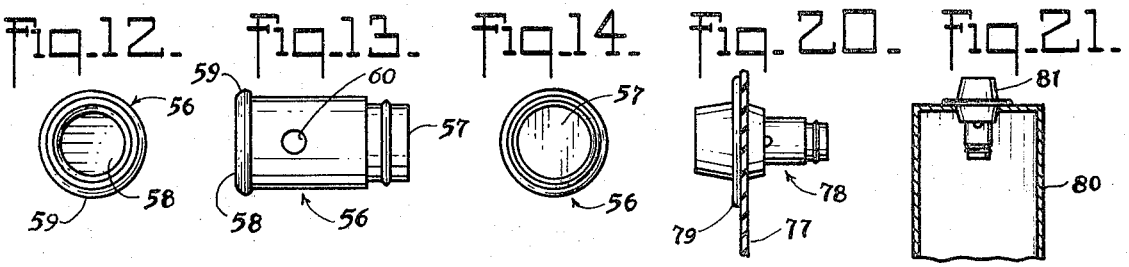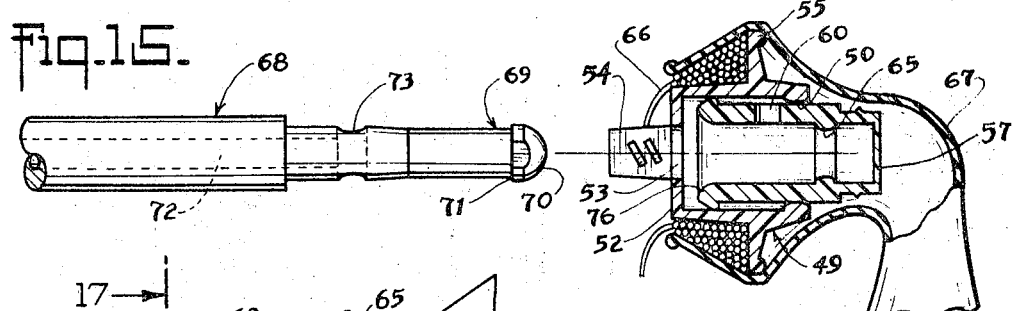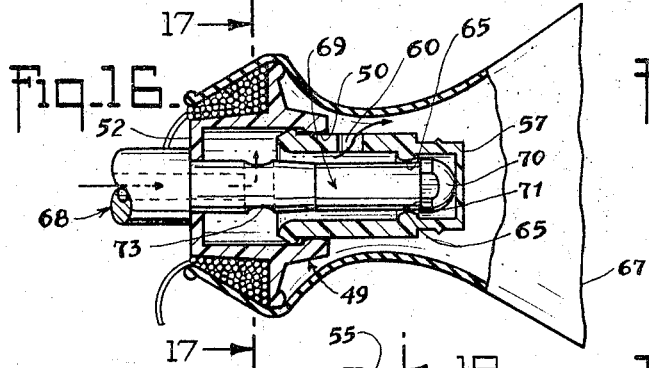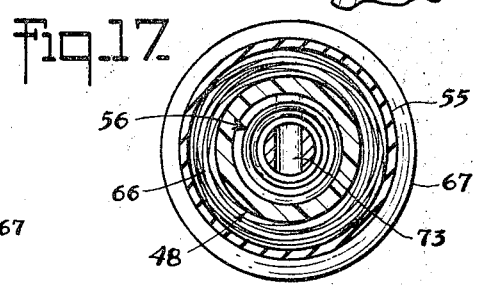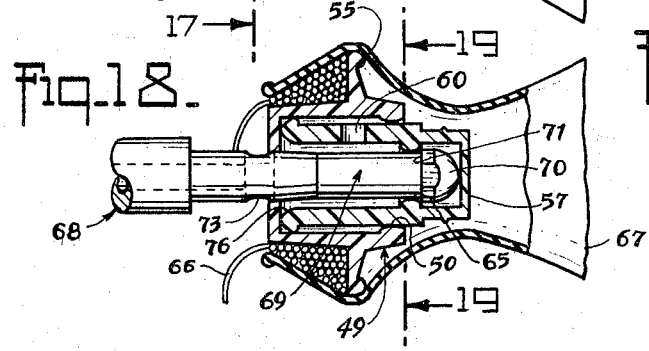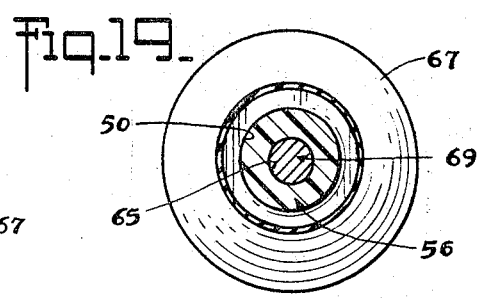

INFLATABLE ARTICLE VALVE

CROSS-REFERENCE TO RELATED APPLICATION

This application is a continuation-in-part of application Ser. No. 825,690, filed May 19, 1969 and now abandoned.

BACKGROUND OF THE INVENTION

Generally, this invention pertains to simply fabricated, low-cost, easily operated valves having a multiplicity of applications and end uses.

More especially, the invention relates to improvements in inflatable articles and particularly to an improved valve device for balloons and other inflatable articles.

For example, in order to facilitate the inflation and selective deflation of inflatable articles, as for example, toy balloons it is a common expedient to attach a check valve to the neck of the balloon which normally permits the flow of pressurized gas only into the balloon and requires a manipulation to permit the exhaustion of the gas from the balloon. The conventional balloon inflation valve possesses numerous drawbacks and disadvantages. It generally relies on the differential pressure between the gas in the balloon and the ambient atmosphere to maintain the valve in a closed condition. However, in toy balloons and similar inflatable devices, the pressure differential between the interior and exterior of the balloon is very small so that the valve closure pressure in correspondingly small with the consequence that high leakage is experienced with these valves. Furthermore, the use of mechanical means or compressed gas tanks for inflating toy balloons with contentional valves frequently is difficult and presents many problems.

SUMMARY OF THE INVENTION

It is a principal object of the present invention to provide an improved valve.

Another object of the present invention is to provide an improved inflation mechanism for inflatable devices.

Still another object of the present invention is to provide an improved inflation valve mechanism for balloons and similar low pressure inflatable devices.

A further object of the present invention is to provide an improved valve mechanism characterized by its reliability, positive, simple and automatic operation, ruggedness, low cost, high versatility and adaptability.

The above and other objects of the present invention will become apparent from a reading of the following description taken in conjunction with the accompanying drawings which are for illustrative purposes only.

In an exemplary embodiment, the present invention contemplates the provision of a valve device comprising an open ended tubular valve body member adapted to be associated with an article in fluid-tight engagement therewith, a tubular valve slide member longitudinally movable in said body member between an advanced open position and a retracted closed position and being in substantially fluid-tight sliding engagement with a peripheral sealing area inside said body member, said slide member being closed at its front end and open at its rear end and having a port formed therein between the ends thereof which communicates with a point forwardly of said sealing area when said slide member is in its open position, stop elements on said body and slide members restricting relative movement thereof between said open and closed positions, and control means including a shoulder formed in said slide member rearwardly of the front end thereof for engaging a tool for retracting said slide member to its closed position.

According to a specific form of the valve device, the valve body member is provided with inwardly directed peripheral end flanges and an outwardly directed intermediate peripheral flange for effecting a gas tight engagement with and radially stretching the neck of an elastomeric article such as a balloon. The valve slide member includes a rear outwardly directed peripheral lip which slideably snugly engages the inside face of the body member between the end flanges.

In one embodiment, an outwardly directed peripheral flange having radial recesses formed in its border is positioned on the slide member forwardly of the body member. Ports are formed in the slide member wall and an inwardly directed deformable peripheral lip is formed in the slide member between its front end and the ports.

A tool or nozzle cooperates with the valve for opening and closing thereof and in specific embodiments includes side outlet ports and a tapered front head having a rear shoulder adapted to engage the front shoulder of the slide member lip to permit the relative advance of the valve body member to a valve closed position.

The improved valve device is simple, reliable and positive in action. The opening and closing thereof is easily effected with the cooperation of the tool or filling nozzle, and the closed valve provides an excellent fluid-tight seal. In the case of an inflatable article sealing is obtained which does not depend on any pressure differential.

BRIEF DESCRIPTION OF THE DRAWINGS

FIG. 9 is a front view of another embodiment of a valve body member;

FIG. 10 is a side view of the valve body member shown in FIG. 9;

FIG. 11 is an end view of the valve body member shown in FIG. 10;

FIG. 12 is a front view of another embodiment of a slide member;

FIG. 13 is a side view of the slide member shown in FIG. 12;

FIG. 14 is an end view of the slide member shown in FIG. 13;

FIG. 15 is a fragmented view of an assembled valve in accordance with the invention associated with an inflatable article and showing another tool or filling nozzle;

FIG. 16 is a fragmented view of the device shown in FIG. 15 illustrating the valve in the open position;

FIG. 17 is a view taken along the line 17—17 of FIG. 16;

FIG. 18 is a fragmented view of the device shown in FIG. 16 illustrating the valve in closed position;

FIG. 19 is a view taken along the lines 19—19 of FIG. 18;

FIG. 20 is a fragmented, schematic view showing another embodiment of the invention; and FIG. 21 is a schematic view of still another embodiment of the invention.

Figure 1:
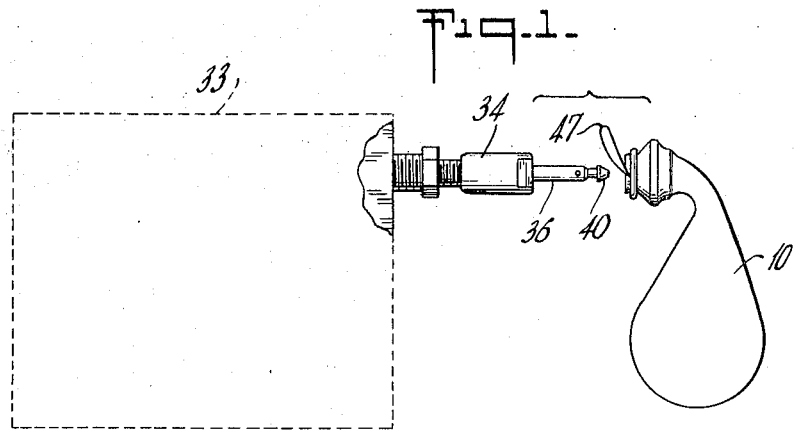
FIG. 1 is a front elevational view of a balloon and compressed gas source shown in separated condition and embodying an embodiment of the present invention.

DESCRIPTION OF THE PREFERRED EMBODIMENTS:

Referring now to FIGS. 1 – 8 of the drawings which illustrate several preferred embodiments of the invention, reference numeral 10 generally designates a conventional inflatable balloon formed of rubber and provided with an improved valve 11 in accordance with the present invention. Valve 11 includes a body member 12 and a valve slide member 13, each being advantageously integrally formed, such as by injection molding or the like, from a resilient deformable polymeric resin, such as a polyolefin or other suitable thermoplastic resin, for example polyethylene or polypropylene.

Figure 7:
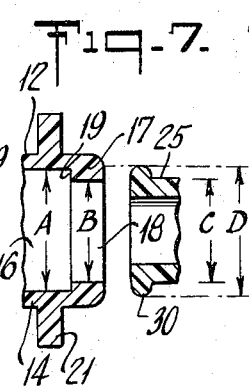
FIG. 7 is an exploded, fragmented longitudinal sectional view of the balloon valve section.
Figure 5:
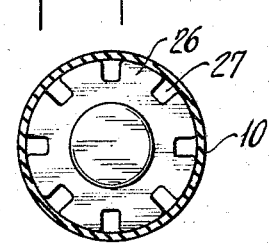
FIG. 5 is a sectional view taken along line 5—5 in FIG. 3.

Body member 12 includes a cylindrical wall 14 delineating a longitudinal bore 16 of circular transverse cross section of diameter A, as shown in FIG. 7. An inwardly directed short, thick flange 17 is formed at the forward end of cylindrical wall 14 and delineates a longitudinal cylindrical bore 18 of diameter B, coaxial with bore 16 and delineated therefrom by an annular shoulder 19. Formed at the rear end of cylindrical wall 14 is an inwardly directed annular flange 20.

In order to expedite the gas tight attachment of valve 11 to balloon 10 there is formed on valve body member 12 a short distance rearwardly of flange 17 an outwardly directed annular coupling flange 21. A tip 22 is positioned on the outer face of cylindrical wall 14 proximate its rear end.

The valve slide member 13 is an integrally formed unit and includes a main tubular rear section 25 having a slightly outwardly diverging peripheral wall 23 and a coaxial cylindrical front cap section 24. An outwardly directed peripheral flange 26 projects from slide member 13 between sections 25 and 24 and is of a diameter between that of flange 21 and cylindrical wall 14. A plurality of circumferentially spaced longitudinal passageway-defining recesses 27 are formed along the periphery of flange 26.

An annular flange or lip 28 is directed inwardly from the inner face of slide member 13 between sections 24 and 25 and is provided with a forwardly inwardly inclined front shoulder 29. An outwardly directed lip or flange 30 having D of rounded peripheral edge projects from the rear edge of slide member section 25. The outside diameter C of unstressed slide member section 25 is slightly greater than the inside diameter B of unstressed flange 17 and the outer diameter D of unstressed flange 30 is of slightly greater diameter than inside diameter a of unstressed body member wall 14. A plurality of circumferentially spaced ports 32 are formed in slide member section 25 a distance rearwardly of the rear face of flange 26 about equal to the thickness of flange 18.

Figure 3:
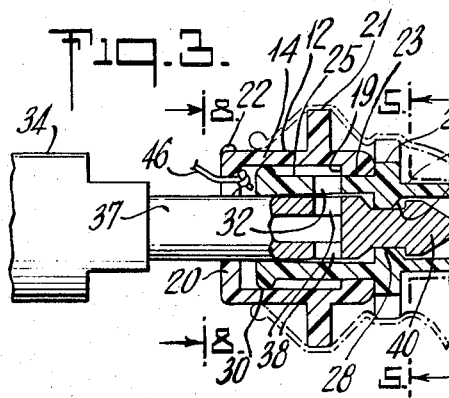
FIG. 3 is a longitudinal sectional view thereof with the nozzle and valve in assembled valve closed condition.

In the assembled condition of valve 11 slide member section 25 projects through body member bore 18 into bore 16. Lip 30 engages the face of bore 16 and forms a slideable gas-tight engagement therewith by reason of the relative diameters thereof and the deformable resilient nature of the material forming the valve members. Similarly the outer face of slide member section 25 forms a slideable gas-tight engagement with the inner face of flange 17. In the closed position of valve 11, body member 12 is shifted to a position wherein flange 26 abuts the front face of body member 12, as shown in FIG. 3, and in the open position of valve 11 body member 12 is shifted to a position where lip 30 abuts the rear face of flange 17 and ports 32 and forward of flange 17, as in FIG. 4.

Cooperating with the valved balloon for inflation thereof is a source of pressurized gas, for example, a tank 33 of compressed helium, to which is connected in any suitable manner by way of control valve mechanism 34 an inflation nozzle 36. Nozzle 36 includes a tubular rear section 37 communicating with the source of compressed gas and is closed at its front end and provided with a pair of opposite outlet ports 38 communicating with the bore of section 37. A shank 39 of lesser diameter than section 37 is coaxial with and projects forwardly from section 37 and is integral therewith. Positioned at the end of shank 39 is an enlarged conical head 40 having a flat annular rear shoulder 41 and a blunted flat forward tip 42. The diameter of the base of head 40 is less than that of the inside face of valve cap section 24 and greater than the inside diameter of lip 28, and the length of head 40 is slightly less than that of cap section 24. The diameter of flange 20 and the longitudinal distance between head shoulder 41 and the rear base of nozzle section 37 is approximately that between flanges 20 and 28 in the valve open position.

Considering now the operation of the improved mechanism described above, valve 11 is inserted into the neck of a balloon on other inflatable device with valve body member 12 outermost, flange 21 engaging the inside face of the neck of the balloon and radially stretching the neck and effecting a gas-tight seal therewith. Flange 26 also engages the neck of balloon 10 inwardly of flange 21 and notches 27 provide air passageways between opposite sides of flange 26.

Figure 4:
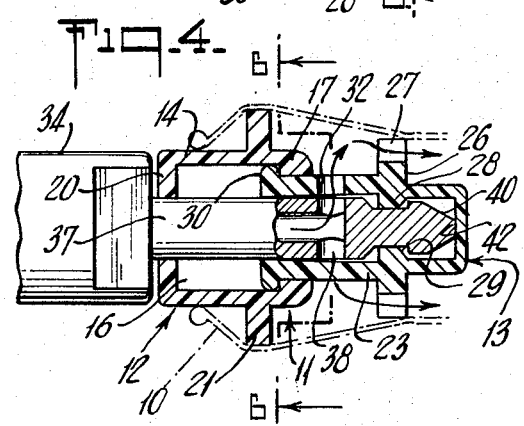
FIG. 4 is a view similar to FIG. 3 with the valve shown in open condition.
Figure 8:
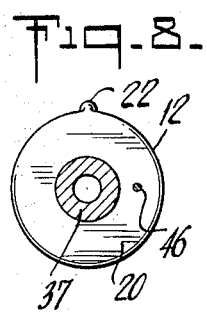
FIG. 8 is a sectional view taken along line 8—8 in FIG. 3.
Figure 6:
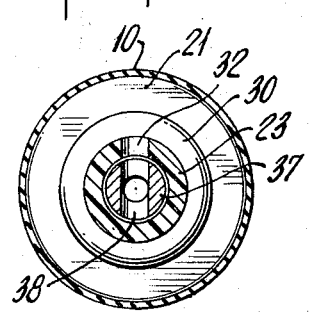
FIG. 6 is a sectional view taken along line 6—6 in FIG. 4.

To inflate balloon 10, valve 11 is grasped through the balloon neck and slipped over nozzle 36 which projects into the bore of slide member 13 until head 40 engages lip 28. Flange 21 is pulled rearwardly to advance body member 12 rearwardly until flange 17 engages flange 30 and further rearward movement of body member 12 causes nozzle head 40 to deform lip 28 and slide past into cap section 24. Nozzle 36 is thus in gaseous communication with the interior of balloon 10 through ports 38 and 32 and the space between the leading end of nozzle section 37 and the inside face of slide member wall 23, as shown in FIG. 4. Valve 34 is opened to inflate the balloon and is then closed.

After the balloon has been inflated valve body member 12 is advanced along slide 13, the latter being prevented from moving forward by head shoulder 41 engaging lip 28. When flange 17 reaches flange 26, as shown in FIG. 3, valve 11 is closed and further advance of body member 12 causes head member 40 to deform lip 28 by way of the tapered shoulder 29 thereby to permit the retraction of head 40 past lip 28 and the closed valve 11 is withdrawn from nozzle 36.

Figure 2:
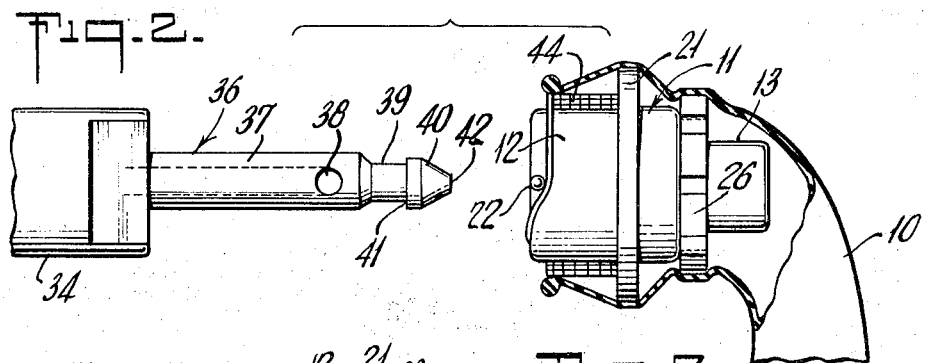
FIG. 2 is a fragmented enlarged front elevation view of an inflation nozzle and valve shown in separated positions with the valve in closed condition.

As illustrated in FIGS. 2 and 3, a balloon holding string 44 may be stored and wound on the outer face of the body member 12 rearwardly of flange 21 with one end 46 thereof suitably attached to body member 12 and the other end thereof being provided with an exposed loop 47.

The string 44 may be of conventional material or may be a plastic one in which case it may be heat sealed or ultrasonically welded to the body member 12. As will be seen in another embodiment, an integral tab is provided in the body member so that the string may be secured thereto by stapling, cementing or otherwise securing in modes well known in the art.

Referring now specifically to FIGS. 9 – 19 inclusive, a valve member is disclosed which has great applicability in fields other than for use in conjunction with inflatable articles such as balloons. However, merely for purposes of illustration, the valves of this invention as depicted in the aforecited figures, pertain specifically to inflatable articles such as balloons.

In this instance, body member 48 is of general tubular construction having an open end 49 with a perimetric annular sealing lip 50, while the diametrically opposed end 51 has an inwardly depending wall 52 defining a central aperture 53 for purposes that will become apparent. As will be seen the sealing lip 50 forms a running seal in cooperation with the exterior surface of slide member 56. The depending wall 52 forms a surface to which a tab 54 is integrally attached. In this case, the body member 48 is fabricated of a deformable moldable plastic such as polyethylene or the like. An outwardly extending flange 55 having a rounded rearwardly directed bead is positioned intermediate the ends 49 and 51. It will be noted, as in the previously described embodiment, that the body member 48 defines an interior bore adapted to receive a slide member 56.

In this exemplary embodiment, the slide member 56 is also of deformable plastic, as is the body member 48, and is adapted to be confined within body member 48 and to move between the open position illustrated in FIG. 16 and the closed position as shown in FIG. 18.

The slide member 56 is of general tubular construction having a front end 57 which is closed by a continuous wall thereof, and an open end 58 around which a circumferential stop element 59 is provided. At least one port 60 is provided intermediate the front end 57 and the rear end 58. In this particular instance, the main tubular portion of slide member 56 is of slightly larger exterior diameter than the exterior diameter of the front end 57 and provides the exterior surface with which sealing lip 50 coacts to effect fluid-tight sealing of the valve. Formed at the juncture of the two portions is a deformable annular shoulder 65 for purposes which will be described hereinafter following.

In assembling the slide valve 56, into cooperative relationship with body member 48, the slide member 56 and particularly the stop element 59 is positioned adjacent the open end 49 and because of the deformability of the materials of construction, continuous urging of slide member 56 into the open end 49 of body member 48, allows the slide member 56 to pass through the constricted opening formed by the protuberance 50 and be received within the confines of body member 48.

The slide member 56 is now in a retained relationship within body member 48 and is axially movable from the extreme open position shown in FIG. 16 to the closed position as illustrated in FIG. 18. It will be noted in this instance that the sealing lip 50, forms a fluid-tight, running seal with the exterior wall of slide member 56. Sealing is also aided by pressure on the outside of member 48 in the case of a pressurized balloon application.

To the tab 54 is secured a length of string 66 by means of stapling, heat sealing or the like, which length of string is wound upon the exterior surface of the body member 48 between the flange 55 and the end 51. The coiled string is retained in place by the fact that the neck of the balloon 67 being of elastomeric material such as rubber, frictionally exerts retaining forces on the coiled string when the assembled valve is associated with the neck of the balloon 67.

In this assembled condition, as illustrated in FIG. 15, the inflatable article or balloon with which the valve is associated is now ready for inflation. Thus, the nozzle 68 connected to a gaseous fluid supply not shown, is of the type that is provided with an end 69 which has a smooth tip 70 of the configuration shown with a shoulder 71 being formed in the back of tip 70, which is adapted to engage the internal shoulder 65 of slide member 56. Likewise, the smooth tip 70 is adapted to engage the closed front wall 57 of slide member 56 for purposes that will become apparent. It will be noted that the tool or nozzle 68 has a fluid conduit or passageway 72 terminating in a perpendicularly positioned bore 73 by which means gas may be introduced into the inflatable article with which the assembled valve is associated. The length of the tool 68 from the filling aperture 73 to the tip 70 should be sufficient so that the slide member 56 may be positioned in the full open and full closed positions as shown in FIGS. 16 and 18 respectively without causing attendant difficulties in filling or in disengaging the filling tool from the slide member 56.

As seen in FIG. 15, the assembled valve is in place in the neck of the balloon 67 and the filling tool 68 is received within the interior of slide member 56 and to facilitate this reception, the end walls forming the interior surface at the central bore may be slightly rounded or tapered as at 76 to receive the tip 70 of filling tool 68.

The continued introduction of the filling tool 68 eventually causes the tip 70 to abut the closed wall 57 of the front end of slide member 56 and will move it towards the right as shown in FIG. 16 until the stop element 59 engages the depending sealing lip 50 provided on the end 49 of body member 48. The valve is now in the full open position and as previously described for the other embodiment, a gaseous fluid may now be introduced into the inflatable article to inflate same, the direction of said gaseous flow being shown by the arrows. After a selected amount of gaseous fluid has been introduced into the inflatable article, fluid flow may be terminated and the valve closed merely by withdrawing the filling tool or nozzle which will move the slide member into the position shown in FIG. 18. The continued movement of filling tool 68 will bring about disassociation of the snap-fitting connection between the shoulder 71 of the tool and the inwardly directed annular shoulder 65 of slide member 56. The tool is then completely removed leaving the inflated article in the inflated condition and the valve in the closed and seated position thereby preventing escape of the contained gas from the inflated article.

Referring now to the remaining figures of the drawings, it will be shown in schematic fashion how the aforedescribed valve of this invention may be adapted and used in fields other than inflatable article filling or the like.

Referring specifically to FIG. 20, an inflatable article such as 77 is of polyethylene or one of the other heat sealable plastics, as may be conventionally found with inflatable water toys and the like, and is provided with a mouth opening adapted to accommodate the assembled valve 78 as disclosed hereinbefore, but modified to the extent that a tab and string is not provided and also wherein the flange of the body member is of slightly different configuration, here shown as a thinner outwardly projecting flange 79 by which means the valve 78 may be heat sealed to the wall 77 of an article as by means of ultrasonic welding, adhesives or means well known in the plastic art. Obviously, the wall 77 of the article need not be of plastic and likewise, the article need not be an inflatable one.

For example, referring now to FIG. 21, a can or bottle 80 is schematically illustrated as having an opening into which an assembled valve 81 is inserted and retained therein by friction-fit relationship or otherwise secured, and in which case a container having certain safety features is provided wherein the liquid or other fluid contained within the container 80 cannot be dispensed unless and until an opening tool is used to open the valve 81 in a manner previously described. Such containers will be found to be especially useful for the containment of hazardous chemicals or fluids wherein it is desired to keep children of tender years from gaining access to the interior of the can, bottle or container. Thus, a separate opening and closing tool similar to that previously disclosed, would be kept in a safe place for use in conjunction with the container and, of course, it need not be provided with a filling bore or conduit since it would merely serve the opening and closing action for the valve 81.

Obviously in specific applications, a seal of foil or the like may be placed over the valve body opening which would have to be broken by the opening tool prior to opening or closing of the valve. This would be used where it is desired to indicate prior opening of the container, loss of sterility, loss of contents and like matters. Also the opening tool or nozzle may be provided with a fluid passageway to direct the flow of fluid to a specific location.

These, as well as other uses, of the valve of this invention will make themselves readily apparent to those of ordinary skill in the art and various modifications and changes will present themselves, all of which will note depart from the spirit and scope of the invention as disclosed herein and as defined by the appended claims.

We claim:

1. A valve comprising an open-ended tubular valve body member adapted to be inserted into fluid-tight engagement with an article, a tubular valve slide member slidably mounted in said body member in substantially fluid tight engagement therewith between and advanced open position and a retracted closed position, said slide member being closed at its front end and open at its rear end, said latter end being enclosed within said body member in all valve positions a port formed in said slide member, between said ends at a locus on said slide member which is exposed outwardly of said body member when said slide member is in its open position and is enclosed within said body member when said slide member is in closed position, and a protuberance on the interior of said slide member adjacent the front end for engaging a retracting tool for retracting said slide member to its closed position.

2. The valve in accordance with claim 1 wherein said members are fabricated of thin-walled material.

3. The valve in accordance with claim 2 wherein said means on the interior of said slide member comprises an interior circumferential shoulder intermediate said front end and said port.

4. The valve in accordance with claim 3 wherein said members are fabricated of molded deformable plastic and said slide member is snap-fitted into said valve body member.

5. The valve in accordance with claim 2 wherein said proturberance on the interior of said slide member comprises in cross-section diametrically opposed protuberances capable of deforming and engaging a tool inserted thereinto in a snap-fitting manner.

6. The valve in accordance with claim 5 wherein said valve body member has an open front end with an inwardly directed peripheral sealing lip and a depending wall portion defining an aperture in an opposite rear end comprising a stop means to limit the extent of axial movement of said slide member.

7. The valve in accordance with claim 6 wherein said sealing lip is formed on the forward portion of said body member.

8. The valve in accordance with claim 7 wherein said sealing lip is beveled.

9. The valve in accordance with claim 8 wherein the exterior diameter of the front end of said slide member is of smaller diameter than the rear end.

10. The valve in accordance with claim 6 wherein said body member is provided with an outwardly extending flange.

11. The valve in accordance with claim 10 wherein said annular flange has an enlarged peripheral edge.

12. An inflatable article valve device comprising an open end tubular valve body member adapted to be inserted into gas tight engagement with an article; a tubular valve slide member longitudinally movable in said body member between an advanced open position and a retracted closed position and being in substantially gas tight sliding engagement with a longitudinally extending peripheral sealing area inside said body member, said slide member being closed at its front end and open at its rear end and having a port formed therein between the ends thereof which communicates with a point forwardly of said sealing area when said slide member is in its open position; stop elements on said body and slide members restricting relative movement thereof between said open and closed positions, and control means including a shoulder formed in said slide member rearwardly of the front end thereof for engaging a tool for retracting said slide member to its closed position, said control means comprising an inwardly directed deformable peripheral lip formed on the inner face of said slide member and provided with said shoulder, said body member has inwardly directed front and rear flanges, and an outwardly directed intermediate flange adapted to engage and outwardly radially stretch the neck of a balloon defining said inflatable article, said slide member slideably engages said body member front flange and includes an outwardly directed rear peripheral lip which slideably engages the inside face of said body member and an outwardly directed peripheral flange forwardly of said port and having a longitudinal passageway formed therein, said port being positioned rearwardly of said body member front flange and said slide member flange engaging the front face of said body member when said slide member is in its retracted closed position.

13. An inflatable article valve device comprising an open ended tubular valve body member adapted to be inserted into gas tight engagement with an article; a tubular valve slide member longitudinally movable in said body member between an advanced open position and a retracted closed position and being in substantially gas tight sliding engagement with a longitudinally extending peripheral sealing area inside said body member, said slide member being closed at its rear end and having a port formed therein between the ends thereof which communicates with a point forwardly of said sealing area when said slide member is in its open position, stop elements on said body and slide member restricting relative movement thereof between said open and closed positions, and means including a shoulder formed in said slide member rearwardly of the front end, said means comprising an inwardly directed deformable peripheral lip formed on the inner face of said slide member and provided with said shoulder, and an inflation nozzle separately slideably engaging the interior of said slide member and effecting a substantially gas-tight seal therewith and having a port communicating with said slide member port, said nozzle upon insertion into said slide member advancing it to an open position, said nozzle having a forwardly tapered front head forwardly of said nozzle port and separated therefrom by a peripheral groove formed in said nozzle and releasably engaging said slide member peripheral lip to retract said slide member to closed position upon withdrawal of said nozzle.

* * * * *